(12) United States Patent
Kurkure

(10) Patent No.: US 9,213,851 B2
(45) Date of Patent: Dec. 15, 2015

(54) LIMITING ACCESS TO A DIGITAL ITEM

(71) Applicant: VMware, Inc., Palo Alto, CA (US)

(72) Inventor: Uday Kurkure, Los Altos Hills, CA (US)

(73) Assignee: VMware, Inc., Palo Alto, CA (US)

( * ) Notice: Subject to any disclaimer, the term of this patent is extended or adjusted under 35 U.S.C. 154(b) by 140 days.

(21) Appl. No.: 13/712,514

(22) Filed: Dec. 12, 2012

(65) Prior Publication Data

US 2014/0165166 A1    Jun. 12, 2014

(51) Int. Cl.
*G06F 21/62* (2013.01)
*G06F 21/31* (2013.01)
*H04L 29/06* (2006.01)

(52) U.S. Cl.
CPC ............... *G06F 21/62* (2013.01); *G06F 21/31* (2013.01); *G06F 21/6209* (2013.01); *H04L 63/083* (2013.01); *H04L 63/10* (2013.01); *H04L 63/123* (2013.01); *H04L 2463/101* (2013.01)

(58) Field of Classification Search
CPC ............ H04L 2463/101; H04L 63/0428; G06F 21/62
See application file for complete search history.

(56) References Cited

U.S. PATENT DOCUMENTS

| 6,064,736 | A  | * | 5/2000 | Davis et al. | 713/155 |
| 6,636,973 | B1 | * | 10/2003 | Novoa et al. | 726/20 |
| 6,643,085 | B2 | * | 11/2003 | Shirai et al. | 360/60 |
| 2002/0111996 | A1 | * | 8/2002 | Jones et al. | 709/203 |
| 2003/0110401 | A1 | * | 6/2003 | Aoshima et al. | 713/202 |

OTHER PUBLICATIONS

Schneck et al.; Persistent access control to prevent piracy of digital information; Published in: Proceedings of the IEEE (vol. 87 , Issue: 7 ); pp. 1239-1250; Date of Publication : Jul. 1999; IEEE Xplore.*
Navarro et al.; Access control with safe role assignment for mobile agents; Published in: Proceeding AAMAS '05 Proceedings of the fourth international joint conference on Autonomous agents and multiagent systems; 2005; pp. 1235-1236; ACM Digital Library.*

* cited by examiner

*Primary Examiner* — Bradley Holder

(57) ABSTRACT

In a method for limiting access to a digital item, a count for the digital item is stored, wherein the count is a number of accesses permitted for the digital item. A password for accessing the digital item is received. A one-way hash function is performed on the password based on the number of accesses of the count to generate a password hash based on the count. The password hash is stored as the stored password hash.

16 Claims, 6 Drawing Sheets

500

STORE A COUNT FOR THE DIGITAL ITEM, WHEREIN THE COUNT IS A NUMBER OF ACCESSES PERMITTED FOR THE DIGITAL ITEM.
510

RECEIVE A PASSWORD FOR ACCESSING THE DIGITAL ITEM.
520

PERFORM A ONE-WAY HASH FUNCTION ON THE PASSWORD BASED ON THE NUMBER OF ACCESSES OF THE COUNT TO GENERATE A PASSWORD HASH BASED ON THE COUNT.
530

PERFORM THE ONE-WAY HASH FUNCTION THE NUMBER OF THE COUNT TIMES.
532

PERFORM THE ONE-WAY HASH FUNCTION A MULTIPLE THE NUMBER OF THE COUNT TIMES.
534

PERFORM THE ONE-WAY HASH FUNCTION AN OFFSET OF THE NUMBER OF THE COUNT TIMES.
536

STORE THE PASSWORD HASH AS THE STORED PASSWORD HASH.
540

*FIG. 5*

LIMITING ACCESS TO A DIGITAL ITEM

BACKGROUND

Various forms of digital items are subject to access controls. These digital items include, but are not limited to, virtual appliances operating on virtual machines, as well as applications, digital media, and digital documents. There are many reasons as to why this is advantageous. For instance, the owner of the digital item may wish to ensure the security of the digital item. Alternatively, the owner of the digital item may wish to ensure that they receive compensation for the use and/or access of the digital item. One way to control access to a digital item is to limit the number of accesses a user may be granted to the digital item.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 5 is a flow diagram of the initialization in a method of limiting the number of accesses to a digital item, in accordance with various embodiments.

DESCRIPTION OF EMBODIMENTS

Figure 1:
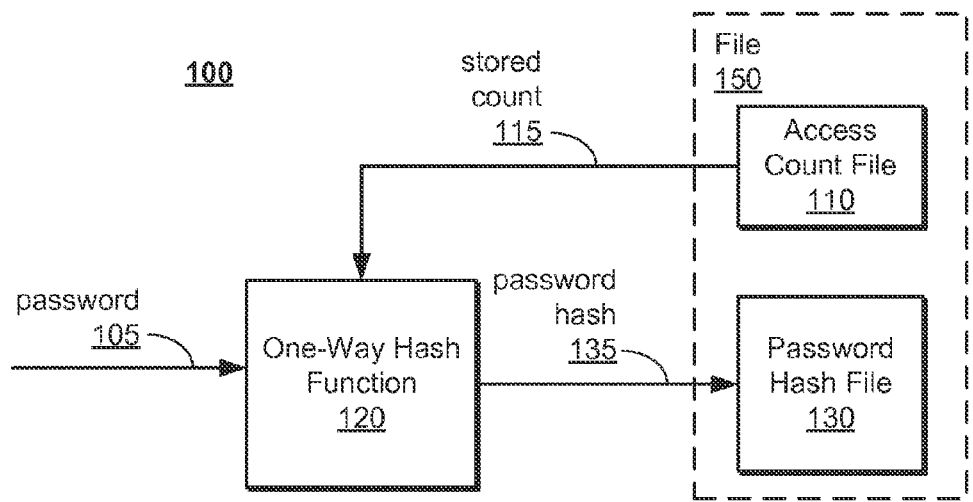
FIG. 1 is an example data flow diagram illustrating initialization of a process for limiting the number of accesses to a digital item, in accordance with embodiments.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "storing," "receiving," "performing," "accessing," "validating," "denying," "granting," "decrementing," "generating," "taking," or the like, often refer to the actions and processes of an electronic computing device or system, such as a virtual machine, among others. In some embodiments, the electronic computing device/system may be a portion of a distributed computing system. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

In accordance with various described embodiments, one way to control access to a digital item is to limit the number of accesses a user may be granted to the digital item. These digital items include, but are not limited to, virtual appliances operating on virtual machines, virtual machines, as well as applications, digital media, and digital documents. Conventional techniques for limiting the number of accesses to a digital item are typically reliant on the security of the access system. For example, the number of permitted accesses to a particular digital item, referred to herein as the "count" or the "stored count" is typically stored in a file, referred to herein as an "access count file." Circumventing conventional techniques for limiting the number of accesses to a digital item is as simple as modifying the count within the access count file. For example, if a user wants to gain more accesses to a digital item, increasing the number of the count will grant them additional accesses.

Systems for limiting the number of accesses to a digital item may be implemented locally or over a distributed computer network, e.g., deployed in a cloud computing environment. Moreover, these systems may be private or public. As such, certain users may be able to access these systems, and the respective access count files, depending on the security measures taken. For example, someone skilled in circumventing security systems of computer systems, such as a hacker, or someone granted extensive administrative privileges to a system, such as a superuser, can easily gain access to and modify the access count file.

Embodiments described herein relate to methods and systems for limiting access to a digital item. The described embodiments associate a one-way password hash and a count of the number of permitted accesses with the digital item. A one-way hash function is performed on the password based on the number of permitted accesses of the count. At initialization and at each access, a password hash is generated using a one-way hash function and is stored. On granted accesses, the count is decremented and the password hash is updated based on the decremented count. At an access request, the same one-way hash function is performed on the entered password based on the count. If the result of the one-way operation on the entered password matches the stored password hash access is granted.

Tampering with the count in an attempt to increase the number of accesses will not succeed in exceeding the number of accesses to the digital item. For example, if the count is modified, the one-way hash of the entered password will not match the stored password hash, since both are based on the stored count.

Herein various systems, methods and techniques for limiting the number of accesses to a digital item are described which utilize one-way hash function based on the number of permitted accesses to the digital item.

Discussion begins with a description of flow diagrams illustrating portions of a process for limiting the number of accesses to a digital item. Operation of various components of a system for limiting the number of accesses to a digital item is further described in conjunction with description of various methods associated with limiting the number of accesses to a digital item.

Example Flow Diagrams for Limiting the Number of Accesses to a Digital Item

FIG. 1 is an example data flow diagram 100 illustrating initialization of a process for limiting the number of accesses to a digital item, in accordance with various embodiments. As depicted, access count file 110 includes the count of the number permitted accesses for a digital item. It should be appreciated that the count of permitted accesses can be stored in different ways, and is not limited to storage in an access count file 110. Moreover, it should be appreciated that access count file 110 can be stored locally or remotely, e.g., in a cloud computing environment.

At initialization, a password 105 for accessing a particular digital item is received. In one embodiment, password 105 is associated with a particular user, e.g., as identified by a username. In one embodiment, a Lightweight Directory Access Protocol (LDAP) server is implemented for handling password hash storage and validation. For instance, Active Directory (AD) utilizing LDAP may be used.

One-way hash function 120 receives password 105 and receives stored count 115 from access count file 110. In one embodiment, a user is supplied with password 105. In another embodiment, a user selects password 105. It should be appreciated that in various embodiments, password 105 is not stored, but rather a hash of password 105 (e.g., password hash 135) is stored. In one embodiment, password 105 is provided as input from a user, e.g., received at a keyboard or touchscreen device. In another embodiment, password 105 is stored on a device (e.g., a magnetic card or thumb drive) and is read by a corresponding input device (e.g., a magnetic card reader or computing system).

One-way hash function 120 is configured to perform a one-way hash function on password 105 based on the number of the stored count. For purposes of the instant description of embodiments, a one-way hash function refers to an operation that converts input text into an output string, referred to as a hash, but is computationally very difficult to retrieve or compute the input text from the output string. Moreover, one-way hash functions may also have the properties whereby it is infeasible to generate a particular hash without knowing both the input and the type of hash function being utilized and it is infeasible to modify the input text without changing the hash. Many different one-way hash functions are known to those of skill in the art. For example, and without limitation, some one-way hash functions include: MD2, MD4, MD5, RIP-EMD, RIPEMD-128, RIPEMD-160, RIPEMD-256, RIPEMD-320, SHA-0, SHA-1, SHA-2, SHA-3, SHA-224, SHA-256, SHA-384, and SHA-512.

In the following example, one-way hash function SHA-256 is used generate hash values for the inputs "10" and "100." Note that the hash values for 10 and 100 are very different. It is also very difficult to determine the original values of 10 and 100 from their hashes.

SHA256("10")=
    0x917df3320d778ddbaa5c5c7742bc4046bf803c36
    ed2b05 0f30844ed206783469
SHA256("100")=
    0xd98fad9074a4b77614bd8b62a73a7dff5928dd0e4
    a412 3400762ed10af19cd92

In one embodiment, one-way hash function 120 performs a one-way hash function on password 105 a number of times corresponding to the number of stored count 115. For example, where n accesses to the digital item remain, such that the value of stored count 115 is n, one-way hash function 120 performs a one-way hash function on password 105 n number of times. That is, one-way hash function 120 would perform a one-way hash function on password 105 to generate an intermediate password hash. In one embodiment, one-way hash function 120 would perform the one-way hash function on successive intermediate password hashes until the one-way hash function has been performed n number of times.

In one embodiment, one-way hash function 120 performs a one-way hash function on password 105 using the same one-way hash function. In another embodiment, one-way hash function 120 performs a one-way hash function on password 105 using a combination of different one-way has functions. In one embodiment, one-way hash function 120 can cycle through a predetermined order of different one-way hash functions. One-way hash function 120 can maintain a list of various one-way hash functions, such that where multiple one-way hash functions are used based on the count, the one-way hash functions of the list are cycled through according to the number of stored count 115. For example, where the stored count 115 is five, and one-way hash function 120 performs five one-way hash functions on a password 105, each successive one-way hash function can be different. For example, all odd one-way hash functions can use SHA-256 and all even one-way hash functions can use SHA-384. It should be appreciated that any ordering of one-way hash functions can be used in accordance with the described embodiments, so long as the same ordering of one-way hash functions is used to validate access to the item, as described below in accordance with FIG. 2.

It should be appreciated that the one-way hash function can be performed on password 105 in other ways, and is not limited to the preceding embodiment. For example, in another embodiment, one-way hash function 120 performs a one-way hash function on password 105 a number of times corresponding to a multiple of the number of stored count 115. In another embodiment, one-way hash function 120 performs a one-way hash function on password 105 a number of times corresponding to an offset of the number of stored count 115. In other words, while the one-way hash function is performed on password 105 a number of times based on the number of stored count 115, it is not limited to being performed the number of times of stored count 115. In contrast, embodiments perform the one-way hash function on password 105 a number of times based on the number of stored count 115.

As depicted, password hash 135 includes the output of one-way hash function 120 after a one-way hash function has been performed on password 105 count number of times. In one embodiment, password hash 135 is stored in password hash file 130. It should be appreciated that password hash 135 can be stored in different ways, and is not limited to storage in password hash file 130. Moreover, it should be appreciated that password hash file 130 can be stored locally or remotely, e.g., in a cloud computing environment.

Furthermore, as depicted in FIG. 1, in various embodiments, access count file 110 and password hash file 130 can be comprised within a single file, such as file 150. However, it should be appreciated that access count file 110 and password hash file 130 need not be comprised within the same file 150. For instance, having them in different files and at different locations might provide better security. It should also be appreciated that access count file 110, password hash file 130, and file 150 can be stored in different ways, and can be stored locally or remotely, e.g., in a cloud computing environment.

Figure 2:
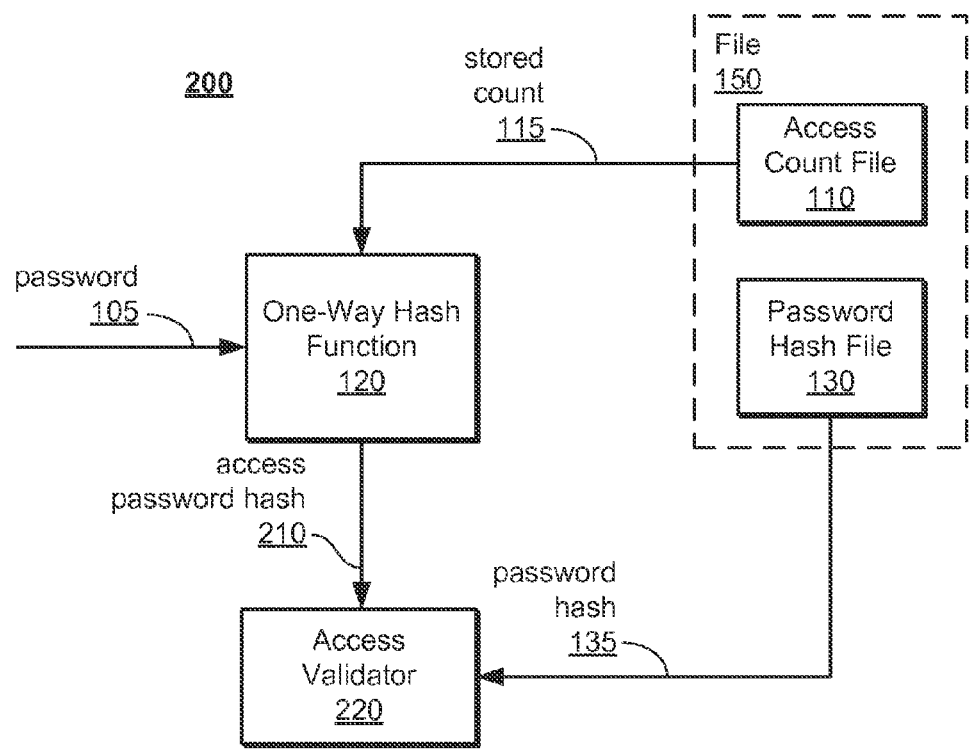
FIG. 2 is an example data flow diagram illustrating validation of a process for limiting the number of accesses to a digital item, in accordance with embodiments.

FIG. 2 is an example data flow diagram 200 illustrating validation in a process for limiting the number of accesses to a digital item, in accordance with various embodiments. As depicted, password 105 is received as part of an access request for a particular digital item. In one embodiment, password 105 is provided as input from a user, e.g., received at a keyboard or touchscreen device. In another embodiment, password 105 is stored on a device (e.g., a magnetic card or thumb drive) and is read by a corresponding input device (e.g., a magnetic card reader or computing system).

One-way hash function 120 receives password 105 and receives stored count 115 from access count file 110. One-way hash function 120 is configured to perform a one-way hash function on password 105 based on the number of the stored count. Access password hash 210 is generated by performing the one-way hash function based on the stored count 115. In one embodiment, one-way hash function 120 performs a one-way hash function on password 105 a number of times equal to the number of stored count 115. In another embodiment, one-way hash function 120 performs a one-way hash function on password 105 a number of times equal to a multiple of the number of stored count 115. In another embodiment, one-way hash function 120 performs a one-way hash function on password 105 a number of times equal to an offset of the number of stored count 115. It should be appreciated that one-way hash function 120 performs the one-way hash function on password 105 in the same way as stored password hash 135 was generated.

In one embodiment, one-way hash function 120 performs a one-way hash function on password 105 using the same one-way hash function. In another embodiment, one-way hash function 120 performs a one-way hash function on password 105 using a combination of different one-way has functions. In one embodiment, one-way hash function 120 can cycle through a predetermined order of different one-way hash functions. One-way hash function 120 can maintain a list of various one-way hash functions, such that where multiple one-way hash functions are used based on the count, the one-way hash functions of the list are cycled through according to the number of stored count 115. It should be appreciated that any ordering of one-way hash functions can be used in accordance with the described embodiments, so long as the same ordering used in validating access to the item is used in the generation of stored password hash 135.

As depicted, access password hash 210 includes the output of one-way hash function 120 after a one-way hash function has been performed on password 105 based on the number of stored count 115.

Access validator 220 receives access password hash 210 and stored password hash 135. Access validator 220 compares access password hash 210 to stored password hash 135. If access password hash 210 and stored password hash 135 are not the same, access to the digital item is denied. Alternatively, if access password hash 210 and stored password hash 135 are equal, access to the digital item is granted. It should be understood that if the count in access count file 110 is tampered with, the access password 105 will be hashed an incorrect number of times and access password hash 210 will not match the stored password hash 135. Thus, tampering with the count does not succeed in gaining unauthorized access.

Figure 3:
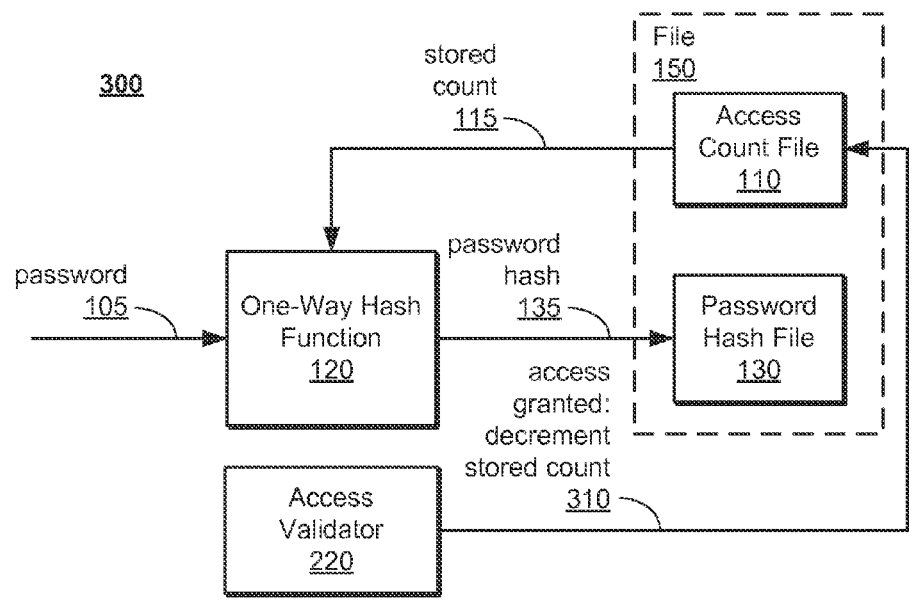
FIG. 3 is an example data flow diagram illustrating updating the stored count and stored password hash in a process for limiting the number of accesses to a digital item, in accordance with embodiments.

FIG. 3 is an example data flow diagram 300 illustrating updating the stored count and stored password hash in a process for limiting the number of accesses to a digital item, in accordance with embodiments. As depicted, responsive to access being granted to the digital item, access count 110 is decremented. For example, where the value of stored count 115 is n, the value of stored count 115 is updated to n−1. In one embodiment, access validator 220 decrements stored count 115 upon granting access, as shown at arrow 310.

One-way hash function 120 then performs a one-way hash function on password 105 n−1 number of times, which is the value of stored count 115. Password hash 135 is generated by one-way hash function 120 and is stored in password hash file 130, replacing the previous password hash 135. In this way, access count file 110 and password hash file 130 or, in another embodiment, file 150, are updated to reflect that the remaining available accesses for the digital item is reflected as stored count 115 and that password hash 135 corresponds to stored count 115. In one embodiment, prior to replacing the previous password hash 135, the new password hash 135 is committed to persistent memory and is confirmed accessible. Once the new password hash 135 is confirmed accessible, the previous password hash 135 is deleted and replaced with the new password hash 135.

Figure 4:
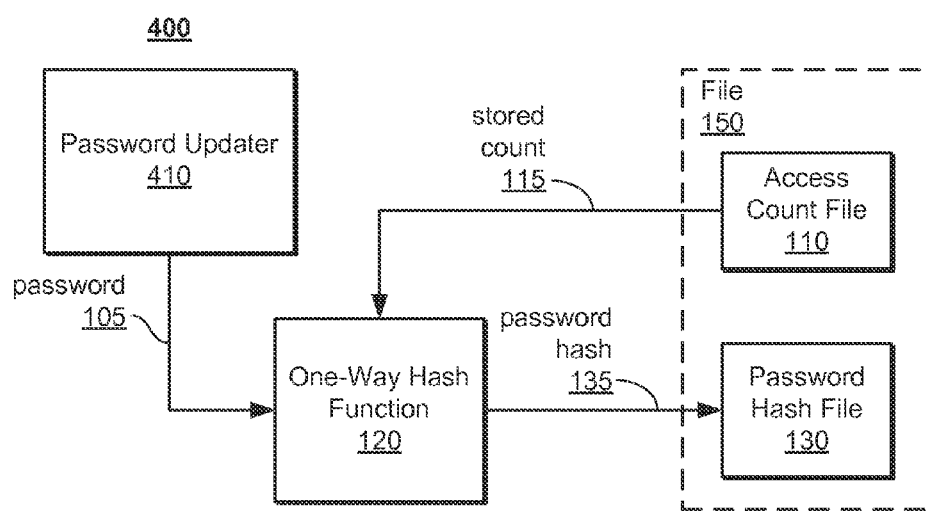
FIG. 4 is an example data flow diagram illustrating the changing of a password in a process for limiting the number of accesses to a digital item, in accordance with embodiments.

FIG. 4 is an example data flow diagram 400 illustrating the changing of a password in a process for limiting the number of accesses to a digital item, in accordance with various embodiments. In the event that a password for accessing a digital item is changed, the corresponding password hash is updated to ensure that access to the digital item is maintained.

In accordance with various embodiments, password updater 410 receives an indication that password 105 has changed. It should be appreciated that the mechanism for verifying and performing the password change is managed separately, for instance, at an LDAP server or by AD. Password updater 410 receives the indication of the change, as well as the changed password 105.

One-way hash function 120 receives password 105 and receives stored count 115 from access count file 110. One-way hash function 120 is configured to perform a one-way hash function on password 105 based on the number of the stored count. In one embodiment, one-way hash function 120 performs a one-way hash function on password 105 a number of times corresponding to the number of stored count 115.

It should be appreciated that the one-way hash function can be performed on password 105 in other ways, and is not limited to the preceding embodiment. For example, in another embodiment, one-way hash function 120 performs a one-way hash function on password 105 a number of times corresponding to a multiple of the number of stored count 115. In another embodiment, one-way hash function 120 performs a one-way hash function on password 105 a number of times corresponding to an offset of the number of stored count 115. In other words, while the one-way hash function is performed on password 105 a number of times based on the number of stored count 115, it is not limited to being performed the number of times of stored count 115. In contrast, embodiments perform the one-way hash function on password 105 a number of times based on the number of stored count 115.

As depicted, password hash 135 includes the output of one-way hash function 120 after a one-way hash function has been performed on password 105 count number of times. In one embodiment, the updated password hash 135 is stored in password hash file 130, replacing the previous password hash 135.

Example Methods of Operation

The following discussion sets forth in detail the operation of some example methods of operation of embodiments. With reference to FIGS. 5 through 8, flow diagram 500, 600, 700 and 800 illustrate example procedures used by various embodiments. Flow diagrams 500, 600, 700 and 800 include some procedures that, in various embodiments, are carried out by a processor under the control of computer-readable and computer-executable instructions. In this fashion, procedures described herein and in conjunction with flow diagrams 500, 600, 700 and/or 800 are, or may be, implemented using a computer, in various embodiments. The computer-readable and computer-executable instructions, e.g., computer readable program code, can reside in any tangible computer readable storage media. Some non-limiting examples of tangible computer readable storage media include random access memory, read only memory, magnetic disks, solid state drives/"disks," and optical disks, any or all of which may be employed. The computer-readable and computer-executable instructions, which reside on tangible computer readable storage media, are used to control or operate in conjunction with, for example, one or some combination of processors of a computing system. It is appreciated that the processor(s) may be physical or virtual or some combination (it should also be appreciated that a virtual processor is implemented on physical hardware).

Although specific procedures are disclosed in flow diagrams 500, 600, 700 and 800, such procedures are examples. That is, embodiments are well suited to performing various other procedures or variations of the procedures recited in flow diagram 500, 600, 700 and/or 800. Likewise, in some embodiments, the procedures in flow diagrams 500, 600, 700 and/or 800 may be performed in an order different than presented and/or not all of the procedures described in one or more of these flow diagrams may be performed. It is further appreciated that procedures described in flow diagram 500, 600, 700 and/or 800 may be implemented in hardware, or a combination of hardware with firmware and/or software.

FIG. 5 is a flow diagram 500 of the initialization of a method of limiting the number of accesses to a digital item, in accordance with various embodiments. It should be appreciated that digital items may include, but are not limited to, virtual appliances operating on virtual machines, virtual machines, as well as applications, digital media, and digital documents.

At procedure 510 of flow diagram 500, in one embodiment, a count for the digital item is stored, wherein the count is a number of accesses permitted for the digital item. In one embodiment, the count is stored in an access count file, e.g., access count file 110 of FIG. 1.

At procedure 520, a password for accessing the digital item is received. In one embodiment, the password is associated with a particular user, e.g., as identified by a username. In one embodiment, the password is provided as input from a user, e.g., received at a keyboard or touchscreen device. In another embodiment, the password is stored on a device (e.g., a magnetic card or thumb drive) and is read by a corresponding input device (e.g., a magnetic card reader or computing system).

At procedure 530, a one-way hash function is performed on the password based on the number of accesses of the count to generate a password hash based on the count. In one embodiment, as shown at procedure 532, the one-way hash function is performed on the password the number of the count times. In another embodiment, as shown at procedure 534, the one-way hash function is performed on the password a multiple of the number of the count times. In another embodiment, as shown at procedure 536, the one-way hash function is performed on the password an offset of the number of the count times.

At procedure 540, the password hash is stored as the stored password hash.

Figure 6:
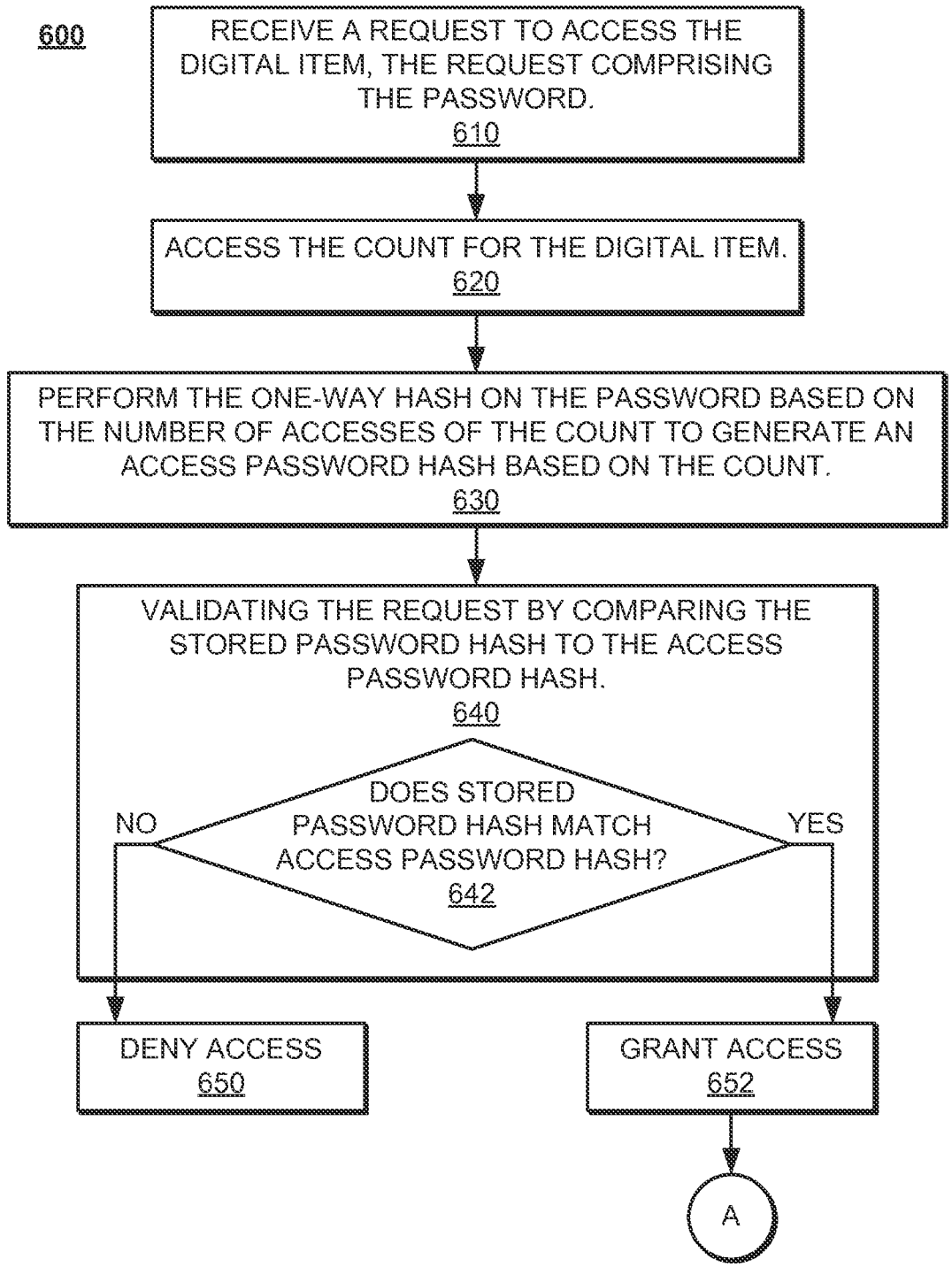
FIG. 6 is a flow diagram of access validation in a method of limiting the number of accesses to a digital item, in accordance with various embodiments.

FIG. 6 is a flow diagram 600 of access validation in a method of limiting the number of accesses to a digital item, in accordance with various embodiments.

At procedure 610 of flow diagram 600, in one embodiment, a request to access the digital item is received, the request including the password. In one embodiment, the password is provided as input from a user, e.g., received at a keyboard or touchscreen device. In another embodiment, the password is stored on a device (e.g., a magnetic card or thumb drive) and is read by a corresponding input device (e.g., a magnetic card reader or computing system).

At procedure 620, the count for the digital item is accessed.

At procedure 630, a one-way hash function is performed on the password based on the number of accesses of the count to generate an access password hash based on the count. It should be appreciated that the one-way hash function can be performed in different ways, so long as the one-way hash function is based on the count and is performed in the same manner as described in procedure 530 of FIG. 5.

At procedure 640, the request is validated by comparing the stored password hash to the access password hash. As shown at procedure 642, it is determined whether the stored password hash matches the access password hash.

If the stored password hash does not match the access password hash, as shown at procedure 650, access to the digital item is denied. Alternatively, if the stored password hash matches the access password hash, as shown at procedure 652, access to the digital item is granted. In one embodiment, flow diagram 600 proceeds to procedure 710 of flow diagram 700.

Figure 7:
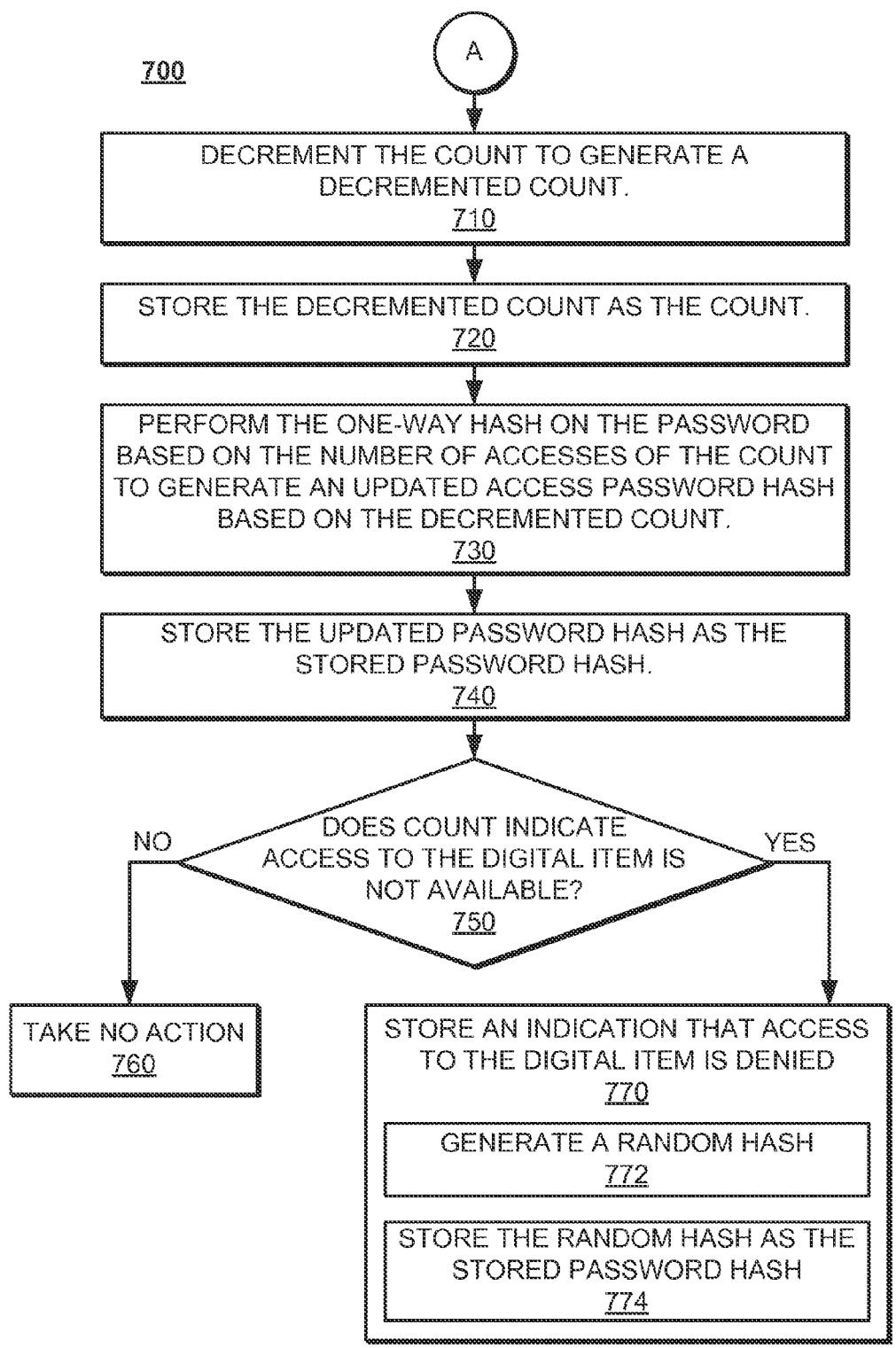
FIG. 7 is a flow diagram of the update of the stored count and stored password hash in a method of limiting the number of accesses to a digital item, in accordance with various embodiments.

FIG. 7 is a flow diagram 700 of the update of the stored count and stored password hash in a method of limiting the number of accesses to a digital item, in accordance with various embodiments. It should be appreciated that in accordance with various embodiments, flow diagram 700 is performed responsive to granting access to a digital item.

At procedure 710 of flow diagram 700, the count is decremented to generate a decremented count. For example, where the value of stored count 115 is n, the value of stored count 115 is updated to n−1.

At procedure 720, the decremented count is stored as the count.

At procedure 730, the one-way hash function is performed on the password based on the number of accesses of the count to generate an updated password hash based on the decremented count.

At procedure 740, the updated password hash is stored as the stored password hash.

In one embodiment, as shown at procedure 750, it is determined whether the count is decremented to a value indicating the access to the digital item is not available.

If it is determined that the count is not decremented to a value indicating the access to the digital item is not available, as shown at procedure 760, no action is taken.

If it is determined that the count is decremented to a value indicating the access to the digital item is not available, as shown at procedure 770, an indication that access to the digital item is denied is stored. In one embodiment, as shown at procedure 772, a random hash is generated. At procedure 774, the random hash is stored as the password hash.

Figure 8:
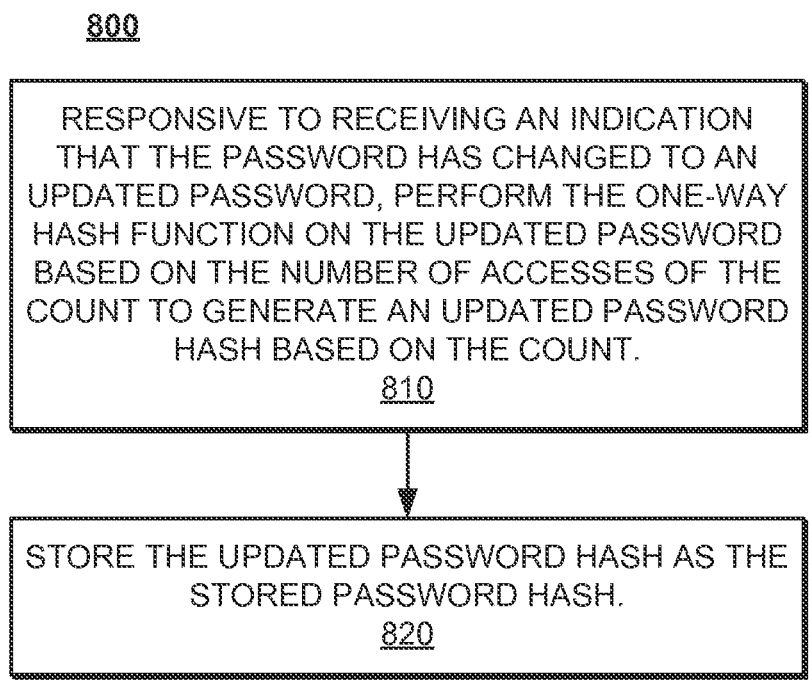
FIG. 8 is a flow diagram of the change of a password in a method of limiting the number of accesses to a digital item, in accordance with various embodiments.

FIG. 8 is a flow diagram 800 of the change of a password in a method of limiting the number of accesses to a digital item, in accordance with various embodiments.

At procedure 810 of flow diagram 800, responsive to receiving an indication that the password has changed to an updated password, the one-way hash function is performed on the updated password based on the number of accesses of the count to generate an updated password hash based on the count.

At procedure 820, the updated password hash is stored as the stored password hash.

While various embodiments describe herein refer to the access of digital items, it should be appreciated that other embodiments are envisioned that are directed towards the access of physical items. For instance, the described systems and methods can be used to control access to physical items by limiting how many times the physical item can be accessed. By way of non-limiting example, a digital lock implementing the described embodiments can be used to limit access to physical items, such as a bank vault, a safe, a room, a house, etc.

In another example, a gaming system in an arcade may be protected by limiting access to a number of prepaid plays. Rather than using money or tokens in the gaming system directly, a password is provided. Each time the gaming system is played, the user enters the password. The gaming system employs the described embodiments to limit the number of plays (e.g., accesses) of the gaming system. In another example, rides on a motorized transport (e.g., a bus, a subway, or a theme park ride) are controlled according to the described embodiment. The user procures a particular number of rides and receives a password. The access to rides is limited to the number of rides the user buys. In one embodiment, the password is stored on a device, e.g., a magnetic card, that can be read by a corresponding device.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A computer-implemented method for limiting access to a digital item, the method comprising:
    storing a count for the digital item in an access count file by a computer, where the count is a number of accesses permitted for the digital item by a user;
    receiving a password of the user for accessing the digital item by the computer;
    performing a one-way hash function by the computer on the password based on the number of accesses of the count, to generate a password hash based on the count;
    storing the password hash as a stored password hash by the computer;
    receiving a request to access the digital item at the computer, the request comprising the password;
    accessing the count for the digital item by the computer from the access count file;
    performing the one-way hash function on the password based on the number of accesses of the count, to generate an access password hash based on the count;
    validating the request by comparing the stored password hash to the access password hash, provided the stored password hash matches the access password hash, granting access to the digital item; and
    decrementing the count and updating the stored password hash.

2. The computer-implemented method of claim 1, wherein the performing a one-way hash function on the password comprises:
    performing the one-way hash function on the password the number of the count times.

3. The computer-implemented method of claim 1, wherein the performing a one-way hash function on the password comprises:
    performing the one-way hash function on the password a multiple of the number of the count times.

4. The computer-implemented method of claim 1, wherein the performing a one-way hash function on the password comprises:
    performing the one-way hash function on the password an offset of the number of the count times.

5. The computer-implemented method of claim 1 further comprising:
    responsive to the granting access to the digital item:
    decrementing the count to generate a decremented count;
    storing the decremented count as the count;
    performing the one-way hash function on the password based on the number of accesses of the count, to generate an updated password hash based on the decremented count; and
    replacing the stored password hash by storing the updated password hash as the stored password hash.

6. The computer-implemented method of claim 5 further comprising:
    provided the count is decremented to a value indicating the access to the digital item is not available, storing an indication that access to the digital item is denied.

7. The computer-implemented method of claim 6, wherein the storing an indication that access to the digital item is denied comprises:
    generating a random hash; and
    storing the random hash as the stored password hash.

8. The computer-implemented method of claim 1 further comprising:
    responsive to receiving an indication that the password has changed to an updated password, performing the one-way hash function on the updated password based on the number of accesses of the count, to generate an updated password hash based on the count; and
    storing the updated password hash as the stored password hash.

9. The computer-implemented method of claim 1, wherein the digital item is selected from a list consisting of:
    a virtual appliance;
    a virtual machine;
    an application;
    a digital media item; and
    a digital document file.

10. The computer-implemented method of claim 1, wherein the validating the request comprises:
    provided the stored password hash does not match the access password hash, denying access to the digital item.

11. A computer-implemented method for limiting access to an item, the method comprising:
- storing a count for the item in an access count file by a computer, where the count is a number of accesses permitted for the item by a user;
- receiving a password of the user for accessing the item by the computer;
- performing a one-way hash function by the computer on the password based on the number of accesses of the count, to generate a password hash based on the count;
- storing the password hash as a stored password hash by the computer;
- responsive to granting access to the item based on a comparison between a newly calculated password hash and the stored password hash:
- decrementing the count to generate a decremented count by the computer;
- storing the decremented count as the count by the computer;
- performing the one-way hash function by the computer on the password based on the number of accesses of the count, to generate an updated password hash based on the decremented count; and
- replacing the stored password hash by storing the updated password hash as the stored password hash by the computer.

12. The computer-implemented method of claim 11 further comprising validating a request to access the item prior to the granting access to the item, the validating the request to access the item comprising:
- receiving the request to access the item, the request comprising the password;
- accessing the count for the item from the access count file;
- performing the one-way hash function on the password based on the number of accesses of the count, to generate an access password hash based on the count; and
- validating the request by comparing the stored password hash to the access password hash, wherein provided the stored password hash matches the access password hash, access is granted to the item.

13. The computer-implemented method of claim 11, wherein the performing a one-way hash function on the password comprises:
- performing the one-way hash function on the password the number of the count times.

14. The computer-implemented method of claim 11, wherein the performing a one-way hash function on the password comprises:
- performing the one-way hash function on the password a multiple of the number of the count times.

15. The computer-implemented method of claim 11, wherein the performing a one-way hash function on the password comprises:
- performing the one-way hash function on the password an offset of the number of the count times.

16. The computer-implemented method of claim 11, wherein the item is a digital item.

* * * * *